Patented May 22, 1923.

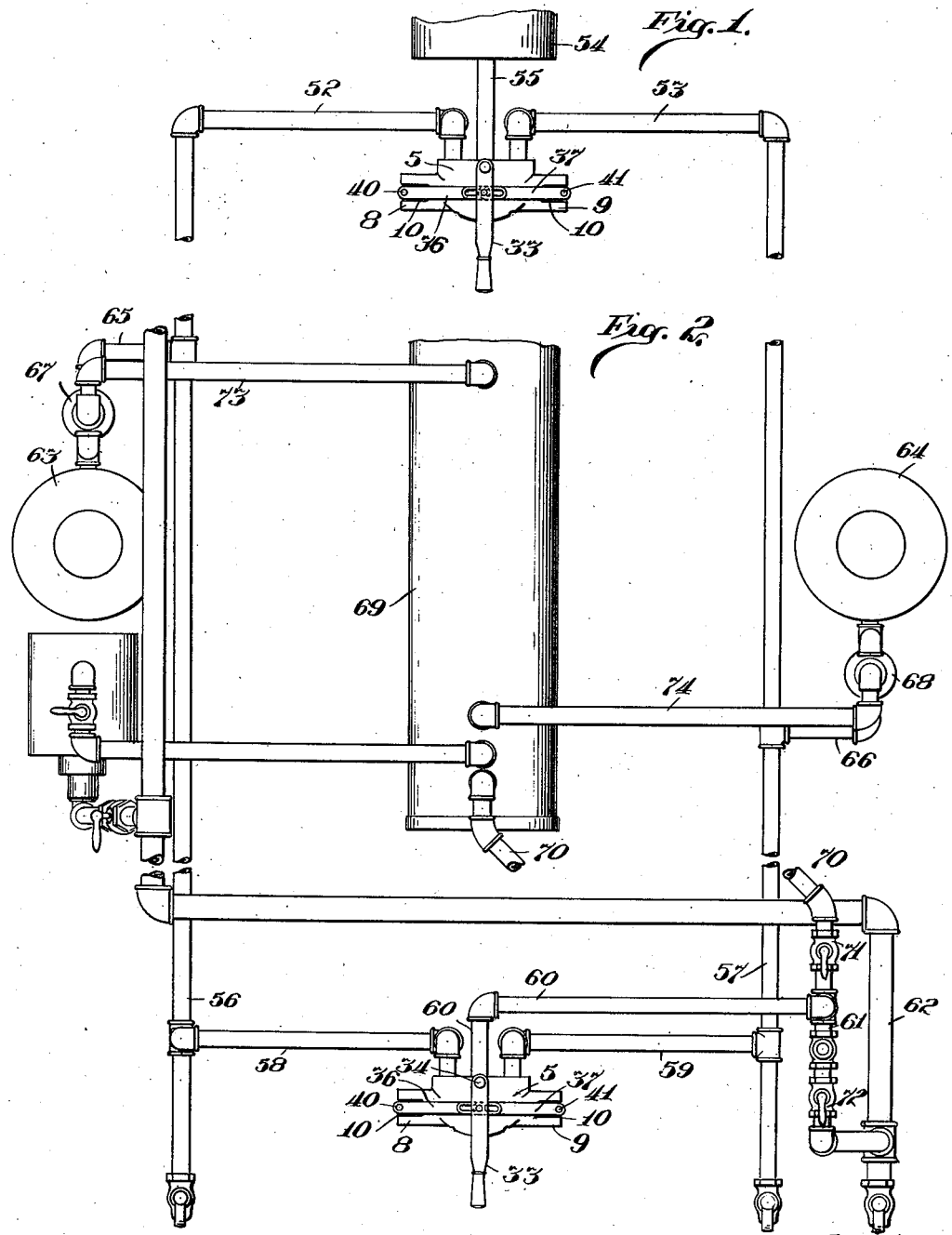

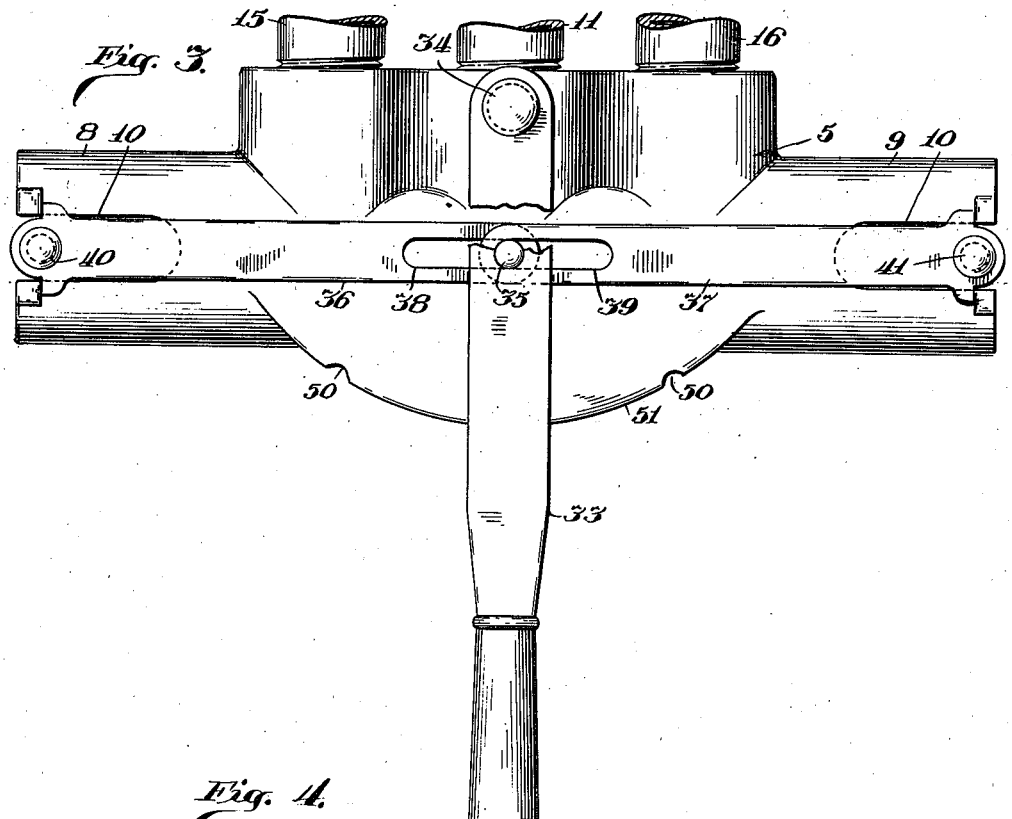
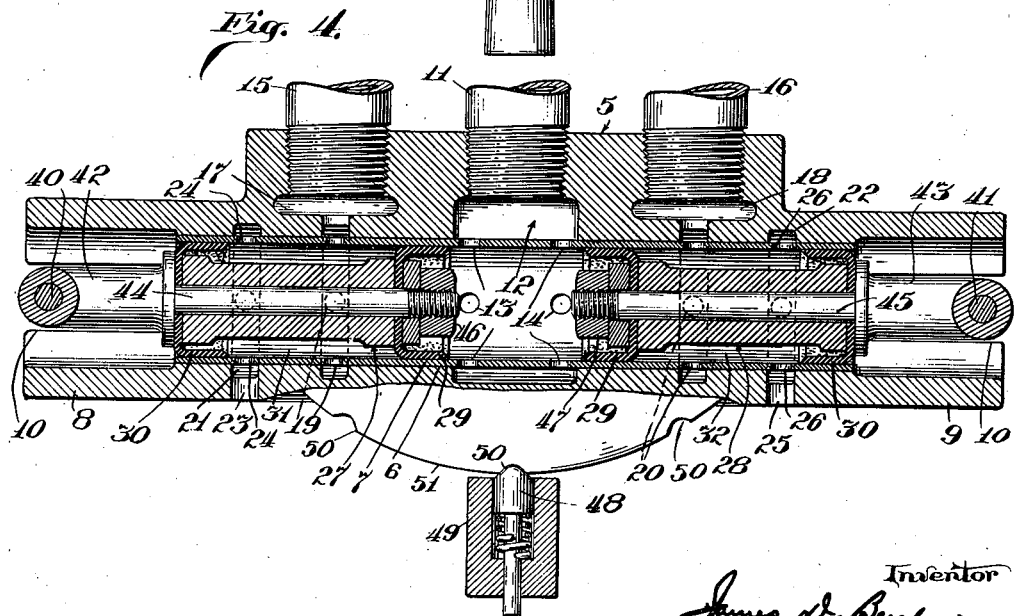

1,456,050

UNITED STATES PATENT OFFICE.

JAMES D. BENBOW, OF AURORA, ILLINOIS, ASSIGNOR TO WESTERN WHEELED SCRAPER COMPANY, OF AURORA, ILLINOIS, A CORPORATION OF ILLINOIS.

AIR-CONTROLLING VALVE MECHANISM.

Application filed February 17, 1919. Serial No. 277,633.

*To all whom it may concern:*

Be it known that I, JAMES D. BENBOW, a citizen of the United States, and a resident of Aurora, in the county of Kane and State of Illinois, have invented certain new and useful Improvements in Air-Controlling Valve Mechanism, of which the following is a specification, reference being had to the accompanying drawings.

My invention relates to controlling devices for use in connection with dump cars or dump car trains to regulate the dumping either of a single car or of a greater or less number of the cars of the train. As is well understood by those familiar with the art, modern dump cars are usually arranged to be dumped by the action of plungers at opposite sides of the car working in compressed air cylinders to which air is admitted through train pipes supplied either from the locomotive reservoir or from reservoirs carried by individual cars. For dumping, air is admitted to the cylinder at the side opposite that at which the load is to be discharged, and to restore the car bed to its carrying or operative position, air is admitted to the cylinder at the opposite or dumping side. In some cases a controlling valve is provided in the engineer's cab to enable him to dump at one time all the cars that may not have been separately cut off, and it has also been proposed to provide individual cars with valve mechanism by which the air from the reservoirs carried by such cars may be employed either to dump a single car or a number of cars of the train. An example of the latter construction is disclosed in my pending application, Serial No. 265,001, filed December 2, 1918.

My present invention has for its object to provide improved valve mechanism which may be employed as an engineer's valve, or may be applied to individual cars for the purpose of controlling the dumping and righting of the bed of one or more cars. As will be readily appreciated, such a valve should be practically fool proof, as when valves are applied to individual cars they are operated by an unintelligent class of labor, and if air should be admitted to the wrong side of the car considerable damage is apt to ensue. It is also very desirable that the valve mechanism be simple in construction so that it is not apt to get out of repair easily under the strenuous conditions attending the use of dump cars. My improved valve accomplishes these objects as will be understood from the following description thereof in connection with the illustrations given in the accompanying drawings, in which I have shown the form in which I prefer to embody my invention. What I regard as new will be set forth in the claims.

In the accompanying drawings:—

Fig. 1 is a plan view of my improved valve mechanism used as an engineer's valve;

Fig. 2 is a similar view showing the application of said valve to a car provided with a reservoir for compressed air or other suitable operating fluid;

Fig. 3 is an enlarged plan view of the valve; and

Fig. 4 is a horizontal section of the parts shown in Fig. 3.

In describing my improved valve mechanism I shall assume that it is used in connection with compressed air as the operating fluid, but it will be understood that the use of any other such suitable fluid is comprehended within the scope of my invention.

Referring to the drawings,—5 indicates a casting which forms the body or casing of the valve proper, and is provided with a cylindrical passage 6 which extends longitudinally therethrough, as shown in Fig. 4, forming what may be termed a valve chamber. Said valve chamber is preferably lined with a sleeve or bushing 7 to provide a smooth inner surface and take the wear. This bushing may readily be removed and replaced when necessary. The casing 5 is provided with cylindrical extensions 8—9 which project beyond the ends of the bushing 7, as shown in Fig. 4, in which extensions are longitudinal slots 10, as shown in Figs. 3—4. The purpose of these slots will be hereinafter set forth.

11 indicates what for convenience will be termed an inlet pipe, which is secured to the central portion of the casing 5, preferably by screw threads, as shown in Fig. 4, and communicates with an annular channel 12 which extends around the chamber 6 and communicates therewith through ports 13—14 in the bushing 7, at opposite sides of and adjacent to the longitudinal center thereof, as shown. 15—16 indicate two pipes which may conveniently be termed outlet pipes, although they serve also as exhaust pipes. These pipes communicate respectively with annular channels 17—18 in the casing 5 which extend around the chamber 6 at opposite sides of the channel 12 and respectively communicate with the interior of the chamber 6 by ports 19—20 in the bushing 7. 21—22 indicate annular channels formed in the casing 5 around the chamber 6 between the channels 17—18, respectively, and the adjacent end portions of the bushing 7. The channel 21 communicates with an exhaust port 23 in the casing 5 and also with the chamber 6 through ports 24 in the bushing 7. In like manner the channel 22 communicates with an exhaust port 25, and with the chamber 6 through ports 26 in the bushing 7.

27—28 indicate two cylindrical slide valves mounted in the chamber 6 to slide longitudinally thereof. Each of these valves comprises a body portion of reduced diameter which carries two pistons or heads, preferably in the form of cup-washers 29—30 spaced apart so that they cooperate with the reduced body portion and with the bushing 7 to form annular ducts 31—32 which are adapted to connect the ports 19 with the ports 24, or the ports 20 with the ports 26, when the valves are in their neutral or exhausting position shown in Fig. 4, and to connect the ports 19 with the ports 13, or the ports 20 with the ports 14, when one or the other of said valves is moved inwardly to a sufficient extent from the position shown in said figure. The heads or washers 29 also serve to cut off the ports 19—20 from the ports 13—14 respectively, when the valves 27—28 are in their exhausting position.

From the foregoing description it will be manifest that assuming that the inlet pipe 11 is supplied with air under pressure, such air will be admitted to the intermediate portion of the chamber 6, but will be cut off from both outlet pipes 15—16 by the heads 29 and from the exhaust ports 24—26 by the heads 30. The heads 29 are obviously exposed to the pressure of the incoming air admitted through the inlet pipe. If now one of the valves, as 27, be moved inwardly until the washer 29 passes the port 13, the ports 13 and 19 will be connected by the duct 31, thereby admitting compressed air from the inlet pipe 11 to the outlet pipe 15. At the same time the valve 28, which as hereinafter explained is not then moved from the position shown in Fig. 4, will connect the outlet pipe 16 with the exhaust port 25 through the duct 32. In like manner the outlet pipe 16 may be connected with the inlet pipe 11 by appropriately moving the valve 28.

In the operation of dump cars it is necessary that air be admitted at one time only to the train pipe at one side of the train, and therefore I provide means by which either of the valves 27—28 may be operated, but only one of them at a time may be moved out of its normal or exhausting position shown in Fig. 4. This means comprises a lever 33 which is pivotally mounted to swing longitudinally of the valve casing 5, being preferably mounted upon a pivot 34 secured to said valve casing, as shown in Fig. 3. This lever is connected intermediately of its length by a pin or pivot 35 to links 36—37 which extend longitudinally of the casing 5 and are provided with slots 38—39, respectively, through which the pin 35 extends. As shown in Fig. 3, the inner ends of the links 36—37 overlap slightly, and when the valves 27—28 are in their normal position, shown in Fig. 4, the pin 35 lies in the outer ends of both slots, as shown in Fig. 3. The outer ends of the links 36—37 are connected respectively to pins 40—41, carried by stems 42—43, respectively, secured to the valves 27—28. As shown in Fig. 4, said stems are preferably provided at their inner ends with bolts 44—45 which extend longitudinally through the valves 27—28 and serve to secure the parts of said valves together. 46—47 indicate nuts screwed upon the inner ends of said bolts, as shown in Fig. 4. It will be noted that the pins 40—41 travel in the slots 10 so that the extensions 8—9 of the valve casing 5 serve to protect the outer ends of the stems 42—43, and the slots 10 serve as guides for the pins 40—41 and the outer end portions of said stems.

From the foregoing description it will be seen that when the lever 33 is in its neutral position, shown in Fig. 3, the valves 27—28 will also be in their neutral or exhausting position, shown in Fig. 4. If now the lever 33 be moved to the left from the position shown in Fig. 3, or in a clockwise direction, the pin 35 will move the link 37 to the left, but will travel in the slot 38 of the link 36 without moving the latter link. Thus the valve 28 will be moved toward the inlet ports 14 while the valve 27 will remain in its exhausting position. When the washer 29 of the valve 28 passes beyond the ports 14 the duct 32 will connect inlet ports 14 with outlet ports 20, thereby supplying air to the outlet pipe 16. At the same time washer 30 will cut off ports 20 from exhaust ports 26. Thus movement of the lever 33 to the left will admit air to pipe 16 at the right hand side of the train or car, thereby dumping the cars to the left. In other words, the operator knows that if he moves the lever 33 to the left, the cars will dump to the left. In like manner, if the lever 33 be moved to the right, the cars will be dumped to the right. The air pressure in the chamber 6 between the valves 27—28 serves to restore them to their exhausting position when the lever 33 is moved back to its neutral position. For holding the lever 33 in its different positions of adjustment it is provided with a spring detent 48 carried in a suitable housing 49 secured to the under side of the lever, said detent being adapted to engage notches 50 in the margin of a segment 51 which projects from the valve casing 5, as shown in Figs. 3 and 4.

In Fig. 1, I have illustrated my improved valve installed for use as an engineer's valve. As illustrated in said figure, 52—53 indicate the two train pipes through which air is supplied to the several cars of the train. These pipes correspond with the outlet pipes 15—16 shown in Figs. 3—4. 54 indicates the usual compressed air reservoir carried by the locomotive, and 55 indicates a supply pipe leading from said reservoir to the valve 5, said pipe corresponding with the inlet pipe 12 shown in Figs. 3—4. It will be noted that when the lever 33, shown in Fig. 1, is moved to the left, air will be admitted to the train pipe 53, causing the cars to dump towards the left, whereas if the lever 33 be moved to the right, air will be admitted to train pipe 52 and the cars dumped in the opposite direction.

In the arrangement shown in Fig. 2, 56—57 indicate train pipes at opposite sides of the car, which are connected respectively by pipes 58—59 with the valve 5 at opposite sides of an inlet pipe 60 which receives air from a pipe 61 connected with a main air pipe 62, the latter pipe being supplied from the locomotive. 63—64 indicate dumping cylinders at opposite sides of the car, and 65—66 indicate pipes which connect the pipes 56—57 with the cylinders 63—64, respectively, through automatic valves 67—68. These valves are preferably of the type shown and described in my pending application hereinbefore referred to. 69 indicates a reservoir carried by the car and arranged to receive air from the pipe 61 through a connecting pipe 70. 71—72 indicate cut-off valves at opposite sides of the point of connection of the pipe 60 with the pipe 61, so that air may be directed either into the pipe 60 or into the reservoir 69 through pipe 70, or may be caused to flow from the reservoir to pipe 60 and thence to the train pipe 56 or 57. 73—74 indicate pipes leading from the reservoir 69 to the automatic valves 67—68, respectively, for actuating said automatic valves by reservoir pressure to restore them to their normal position. With the arrangement illustrated in Fig. 2, it will be seen that the valve lever 33 may be employed to dump or right the cars regardless of whether they are operated by air supplied directly from the locomotive or by air coming from one of the car reservoirs, and in either case the direction in which the valve lever 33 is moved corresponds with the direction in which the car or cars are to be dumped. In practice the valve 5 is placed at one end of the car so that it can be conveniently operated from either side by reaching between adjoining cars, and as even the most unintelligent operator can be educated to know that he must always push the lever away from him in dumping, and pull it towards him in righting the cars, the danger of accident from an incorrect operation of the lever becomes negligible. The valve is so simple in construction that it is hardly possible for it to get out of order, except as a result of wear from long continued use, and then the worn parts may be very easily replaced. While my improved valve is intended primarily for use on dump cars it may be used in any other situation to which it is adapted.

What I claim as my invention and desire to secure by Letters Patent, is:—

1. The combination with a supply pipe and outlet pipes, of a valve comprising a chamber having an inlet communicating with said supply pipe, and outlet ports communicating with said outlet pipes, respectively, valves in said chamber at opposite sides of said inlet and exposed to the pressure therein, said valves being separately movable against the pressure in said chamber to connect one or the other of said outlet ports with said inlet, an operating device, and connections movable thereby independently of each other for so moving either of said valves.

2. The combination with a supply pipe and outlet pipes, of a valve comprising a chamber having an inlet communicating with said supply pipe, and outlet ports communicating with said outlet pipes, respectively, valves in said chamber at opposite sides of said inlet and exposed to the pressure therein, said valves being separately movable against the pressure in said chamber to connect one or the other of said outlet ports with said inlet, a lever, and connections movable thereby independently of each other for so moving either of said valves.

3. The combination with a supply pipe and outlet pipes, of a valve comprising a chamber having an inlet communicating with said supply pipe, and outlet ports communicating with said outlet pipes, respectively, slide valves in said chamber at opposite sides of said inlet having heads exposed to the pressure of fluid entering through said inlet, said valves being separately movable against the pressure in said chamber to connect one or the other of said outlet ports with said inlet, an operating device, and connections movable thereby independently of each other for so moving either of said valves.

4. The combination with a supply pipe and outlet pipes, of a valve comprising a chamber having an inlet communicating with said supply pipe, outlet ports communicating with said outlet pipes, respectively, exhaust ports adapted to be connected with said outlet pipes, cylindrical slide valves in said chamber at opposite sides of said inlet operating to connect the outlet ports respectively either with the inlet or with the exhaust, said valves being movable independently of each other, an operating device, and connections movable thereby independently of each other for so moving either of said valves.

5. The combination with a supply pipe and outlet pipes, of a valve comprising a chamber having an inlet port communicating with said supply pipe, outlet ports at opposite sides of said inlet communicating respectively with said outlet pipes, exhaust ports adjacent to said outlet ports, valves in said chamber at opposite sides of said inlet and separately movable to connect one or the other of said outlet ports with said inlet, said valves operating normally to connect said outlet ports with said exhaust ports, an operating device, and connections movable thereby independently of each other for separately moving said valves.

6. The combination with a supply pipe and outlet pipes, of a valve comprising a chamber having an inlet communicating with said supply pipe, outlet ports at opposite sides of said inlet communicating respectively with said outlet pipes, exhaust ports adjacent to said outlet ports, valves separately movable to connect one or the other of said outlet ports with said inlet, said valves operating normally to connect said outlet ports with said exhaust ports, a lever, and connections movable thereby independently of each other for separately moving said valves.

7. The combination with a supply pipe and outlet pipes, of a valve comprising an elongated cylindrical chamber having an inlet communicating with said supply pipe, outlet ports at opposite sides of said inlet communicating with said outlet pipes, respectively, exhaust ports adapted to be connected with said outlet pipes, valves in said chamber at opposite sides of said inlet and separately movable longitudinally thereof to connect one or the other of said outlet pipes with said supply pipe or with an exhaust port, an operating device, and connections movable thereby independently of each other for so moving either of said valves.

8. The combination with a supply pipe and outlet pipes, of a valve comprising a chamber communicating with said supply pipe, and outlet ports communicating with said outlet pipes, respectively, valves in opposite end portions of said chamber and separately movable to connect one or the other of said outlet pipes with said supply pipe, a lever for so moving either of said valves, and links operatively connecting said lever with said valves, one of said links being actuated by the movement of said lever from its neutral position, and the other of said links being actuated by the movement of said lever in the opposite direction from its neutral position.

9. The combination with a supply pipe and outlet pipes, of a valve comprising a chamber communicating with said supply pipe, and outlet ports communicating with said outlet pipes, respectively, valves in opposite end portions of said chamber and separately movable to connect one or the other of said outlet pipes with said supply pipe, a lever for so moving either of said valves, and links operatively connecting said lever with said valves, each of said links having a slide connection with said lever, whereby movement of said lever in one direction from its neutral position operates one of said valves, and movement of said lever in the opposite direction operates the other of said valves.

10. The combination with a supply pipe and outlet pipes, of a valve comprising a chamber communicating with said supply pipe, and outlet ports communicating with said outlet pipes, respectively, valves in opposite end portions of said chamber and having heads exposed to the pressure therein, said valves being separately movable against such pressure to connect one or the other of said outlet ports with said supply pipe, a lever, and connections movable thereby independently of each other for so moving either of said valves, said lever being arranged to move in the same direction as the valve which it is actuating.

11. A controlling valve comprising a casing having a valve chamber and an inlet leading thereto, outlet ports at opposite sides of said inlet, valves in said chamber at opposite sides of said inlet and exposed to the pressure therein for cutting off said outlet ports from said inlet and separately movable against such pressure to connect one or the other of said outlet ports with said inlet, an operating device and connections movable thereby independently of each other for actuating either of said valves.

12. A controlling valve comprising a casing having a valve chamber and an inlet leading thereto, outlet ports at opposite sides of said inlet, valves in said chamber at opposite sides of said inlet and exposed to the pressure therein for cutting off said outlet ports from said inlet and separately movable against such pressure to connect one or the other of said outlet ports with said inlet, a single lever and connections movable thereby independently of each other for separately actuating either of said valves.

13. The combination with a supply pipe and outlet pipes, of a valve comprising a chamber having an inlet communicating with said supply pipe, outlet ports communicating with said outlet pipes, respectively, exhaust ports adapted to be connected with said outlet pipes, valves in said chamber at opposite sides of said inlet and operating to connect the outlet ports respectively either with the inlet or with the exhaust, said valves being movable independenly of each other, an operating device, and connections movable thereby independently of each other for so moving either of said valves.

14. The combination with a supply pipe and outlet pipes of a valve comprising a chamber having an inlet communicating with said supply pipe, outlet ports communicating with said outlet pipes, respectively, exhaust ports adapted to be connected with said outlet pipes, valves in said chamber at opposite sides of said inlet and operating to connect the outlet ports respectively either with the inlet or with the exhaust, said valves being movable independently of each other, a single lever, and connections movable thereby independently of each other for so moving either of said valves.

15. A controlling valve comprising a casing having a valve chamber and an inlet leading thereto, exhaust ports at opposite sides of said inlet, outlet ports between said exhaust ports and said inlet, devices in said chamber at opposite sides of said inlet for cutting off said outlet ports from said inlet and for connecting said outlet ports with said exhaust ports, said devices being movable independently of each other to connect one or the other of said outlet ports with said inlet, an operating device and connections movable thereby independently of each other for separately actuating either of said devices.

16. A controlling valve comprising a casing having a valve chamber and an inlet leading thereto, exhaust ports at opposite sides of said inlet, outlet ports between said exhause ports and said inlet, devices in said chamber at opposite sides of said inlet for cutting off said outlet ports from said inlet and for connecting said outlet ports with said exhaust ports, said devices being movable independently of each other to connect one or the other of said outlet ports with said inlet, a single lever and connections movable thereby independently of each other for separately actuating either of said devices.

JAMES D. BENBOW.